(12) United States Patent
Kordelin et al.

(10) Patent No.: US 8,741,418 B2
(45) Date of Patent: Jun. 3, 2014

(54) METHOD FOR MANUFACTURING OF CELLULAR BOARD, CELLULAR BOARD, METHOD FOR PRODUCING CELLULAR BOARD ELEMENT OF STEEL PLATE STRIP, AND PRODUCTION LINE

(75) Inventors: Tapio Kordelin, Turku (FI); Juha Lahtivuori, Littoinen (FI)

(73) Assignee: Neapo Oy, Uusikaupunki (FI)

( * ) Notice: Subject to any disclaimer, the term of this patent is extended or adjusted under 35 U.S.C. 154(b) by 362 days.

(21) Appl. No.: 12/091,227

(22) PCT Filed: Nov. 8, 2006

(86) PCT No.: PCT/FI2006/000359
§ 371 (c)(1),
(2), (4) Date: Apr. 23, 2008

(87) PCT Pub. No.: WO2007/054608
PCT Pub. Date: May 18, 2007

(65) Prior Publication Data
US 2008/0286552 A1 Nov. 20, 2008

(30) Foreign Application Priority Data

| Nov. 8, 2005 | (FI) | 20051131 |
| Dec. 27, 2005 | (FI) | 20051327 |
| Feb. 7, 2006 | (FI) | 20060117 |
| May 8, 2006 | (FI) | 20060443 |
| Jul. 6, 2006 | (FI) | 20060659 |
| Sep. 20, 2006 | (FI) | 20060838 |

(51) Int. Cl.
*B32B 3/00* (2006.01)
*B32B 3/20* (2006.01)

(52) U.S. Cl.
USPC .......................................... 428/166; 428/188

(58) Field of Classification Search
USPC ......... 428/166, 188, 121, 122, 126, 129, 130, 428/128, 192, 53–61, 72, 75; 52/578, 579, 52/580, 581, 588.1, 582.2, 582.1, 583.1, 52/590.2, 590.1, 590.3, 591.1, 591.2, 52/591.3, 591.4, 591.5, 793.11, 792.1, 52/792.11, 223.7, 416, 520, 530, 784.12; 160/235; 29/505–521

See application file for complete search history.

(56) References Cited

U.S. PATENT DOCUMENTS 764,219 A * 7/1904 Volp .............................. 52/223.7
(Continued)

FOREIGN PATENT DOCUMENTS

DE 1 900 651 9/1970
(Continued)

OTHER PUBLICATIONS

International Search Report for PCT/FI2006/000359 mailed Feb. 1, 2007.

(Continued)

*Primary Examiner* — Catherine A Simone
(74) *Attorney, Agent, or Firm* — Nixon & Vanderhye P.C.

(57) ABSTRACT

The object of the invention is a method for manufacturing cellular board (1), a cellular board, a method for producing cellular board element of steel plate strip, and a production line. A cellular board (1) according to the invention comprises a number of originally separate profiles (4, 6) of plate-like material, which have been fastened to each other. A single profile is intended to form in a finished cellular board a substantially planar first surface projection (6, 6'), a substantially planar second surface projection (6", 6'''), a core (4, 4'), which is arranged to interconnect the first and second surface projections. In the cellular board (1) the profiles are fastened to each other so that in the adjacent lamellae the first surface projections (6, 6') are located side by side and form thus a first surface plate (2) of the cellular board, the second surface projections (6", 6''') are located side by side and form thus a second surface plate (3) of the cellular board, the profile cores (4, 4') form the core structure of the cellular board.

13 Claims, 16 Drawing Sheets

(56) References Cited

U.S. PATENT DOCUMENTS

| | | | |
|---|---|---|---|
| 1,701,304 A | 2/1929 | Jones | |
| 1,713,099 A | 5/1929 | Sherman | |
| 2,164,681 A | 7/1939 | Fould | |
| 3,842,647 A | 10/1974 | Knudson | |
| 3,875,642 A | 4/1975 | Knudson | |
| 3,887,419 A | 6/1975 | Geschwender | |
| 4,364,253 A | 12/1982 | Knudson | |
| 4,447,288 A | 5/1984 | Seaman | |
| 4,505,082 A * | 3/1985 | Schmitz | 52/309.8 |
| 5,491,947 A | 2/1996 | Kim | |
| 5,623,805 A | 4/1997 | Morello | |
| 6,085,485 A * | 7/2000 | Murdock | 52/783.19 |
| 6,167,669 B1 | 1/2001 | Lane | |
| RE38,064 E | 4/2003 | Morello | |
| 6,574,938 B1 | 6/2003 | Francesco et al. | |
| 2003/0110730 A1 | 6/2003 | Vos | |
| 2006/0000547 A1 | 1/2006 | Roberge et al. | |
| 2007/0180881 A1 | 8/2007 | Ingvarsson | |
| 2008/0163808 A1 | 7/2008 | Kordelin | |

FOREIGN PATENT DOCUMENTS

| | | |
|---|---|---|
| DE | 1759 411 | 6/1971 |
| FI | 91133 | 2/1994 |
| FI | 108929 | 4/2002 |
| FI | 0939176 | 4/2005 |
| FR | 791.124 | 12/1935 |
| FR | 1.304.141 | 9/1962 |
| GB | 846315 | 8/1960 |
| GB | 2017541 | 10/1979 |
| JP | 58-29534 | 2/1983 |
| JP | 5-245554 | 9/1993 |
| JP | 7-509548 | 10/1995 |
| JP | 2002-180593 | 6/2002 |
| JP | 2003-74957 | 3/2003 |
| WO | 85/05141 | 11/1985 |
| WO | 94/02697 | 2/1994 |
| WO | 94/27760 | 12/1994 |
| WO | WO 2005/082559 A1 | 9/2005 |

OTHER PUBLICATIONS

International Preliminary Report on Patentability for PCT/FI2006/000359 completed Feb. 5, 2008.

* cited by examiner

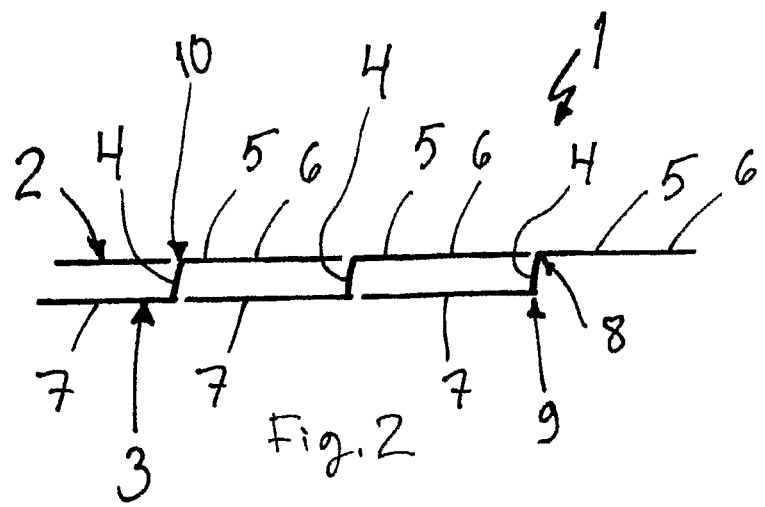
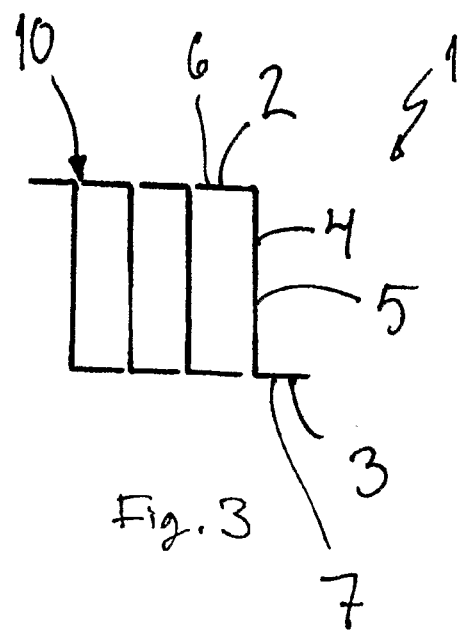

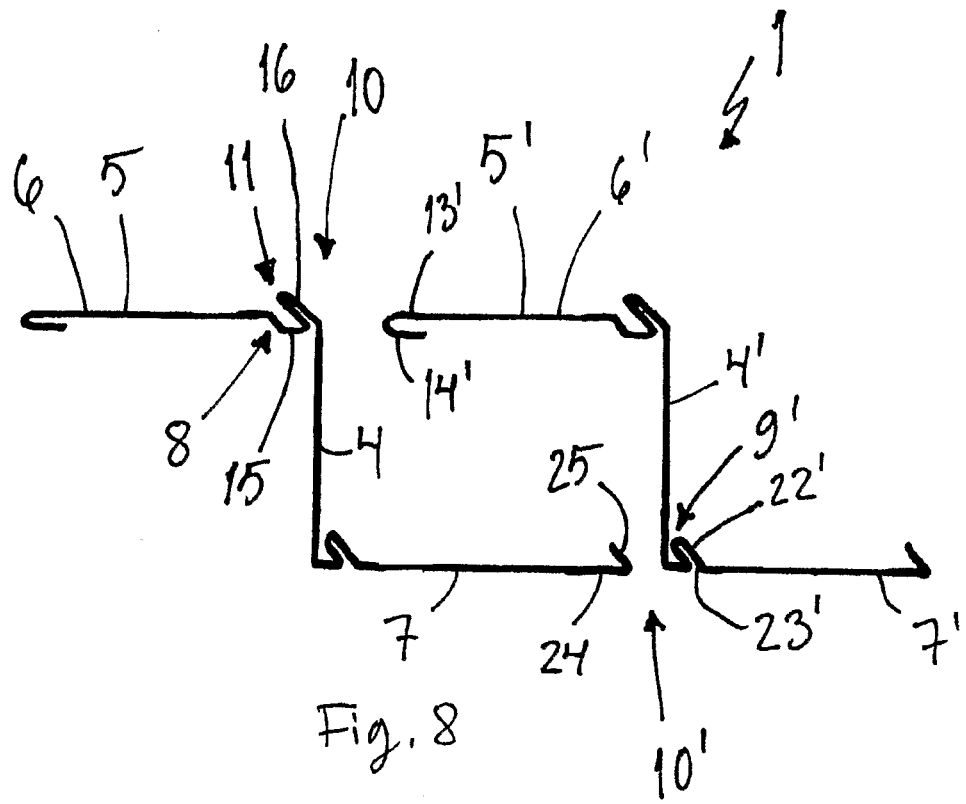
Fig. 8
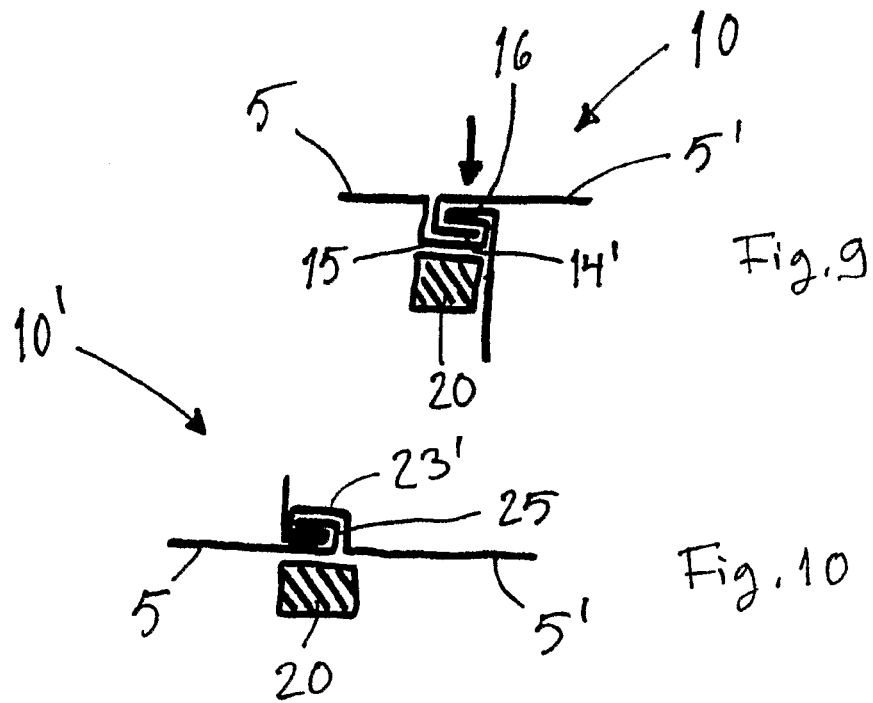
Fig. 9
Fig. 10

METHOD FOR MANUFACTURING OF CELLULAR BOARD, CELLULAR BOARD, METHOD FOR PRODUCING CELLULAR BOARD ELEMENT OF STEEL PLATE STRIP, AND PRODUCTION LINE

This application is the U.S. national phase of International Application No. PCT/FI2006/000359 filed 8 Nov. 2006 which designated the U.S. and claims priority to Finland Patent Application Nos. 20051131 filed 8 Nov. 2005, 20051327 filed 27 Dec. 2005, 20060117 filed 7 Feb. 2006, 20060443 filed 8 May 2006, 20060659 filed 6 Jul. 2006 and 20060838 filed 20 Sep. 2006, the entire contents of each of which are hereby incorporated by reference.

FIELD

The object of the invention is a method for manufacturing cellular board, a cellular board, a method for producing cellular board element of steel plate strip, and a production line, according to the preambles of the independent claims presented below. Particularly the invention relates to a new way for manufacturing cellular boards.

BACKGROUND

Cellular board refers to a structure known as such, which is formed by two substantially parallel surface plates and a core arranged between them. Typically also the core is of plate-like material, but arranged with a form having a direction different from that of the surface plates, for instance by forming folds and grooves between them in the plate material. Typically the core comprises a number of adjacent and parallel straight forms, generally extending substantially over the whole cellular board. The longitudinal direction of the straight forms of the cellular board's core is in this text called the core direction. The cellular board resists bending particularly well in the direction perpendicular to the core direction. The core of prior art cellular board is typically a structure, which is originally separate from the surface plates, but firmly fastened to the surface plates. Typically the surface plates and the core are welded to each other, for instance with laser welding or spot welding. It is also known to glue the surface plates and the core to each other. In a cellular board the surface plates and the core are typically made of metal, e.g. stainless steel or aluminium, but also other materials may come into question. The thickness and the material of the surface plates and the core, and the shape of the core can be dimensioned to suit each situation. The cellular board structure can provide a structure, which is substantially lighter and more rigid, and which better resists bending than a homogenous board structure. The shape of the core strongly influences the rigidity and the strength of the cellular board. A core made of steel can for instance be made of plate, which is bent in a wave-shape where the crests of the waves are typically welded to the surface plates. The cores can also be arranged for instance into the form of the letter V, or they can be formed by plates, which are arranged substantially perpendicular to the surface plates, i.e. in the form of the letter I. The core can be formed by a plate, which is bent in a honeycomb-shape. Bars in the form of tubes with a circular cross-section or other forms can be used as a core.

A problem of traditional cellular board solutions is that it is difficult to fasten the cores of the cellular boards to the surface plates, particularly at the central part of boards with a large area. The manufacture has required expensive equipment. One problem of traditional cellular boards has been that generally only cellular boards of a certain size could be easily made of the same raw materials.

Base floors of buildings are often built of concrete. A base floor is generally supported onto horizontal beams, for instance onto concrete beams. If vertical piles, such as steel piles are used to support the base floor it has required special solutions to fasten the piles. Horizontal piles also required particular construction solutions. The insulation of concrete base floors has also required their own special solutions.

SUMMARY

An object of the invention is to reduce or even to eliminate the problems occurring in prior art mentioned above.

An object of the invention is particularly to provide a solution, with which cellular board can be manufactured in an inexpensive, rapid and efficient way.

An object of the invention is particularly to provide a solution, where hot galvanized steel plate can be used as raw material for cellular steel boards without causing damage to the coating.

An object of the invention is particularly to provide a solution, with which base floors of buildings can be made at least partly of cellular board, and made in an inexpensive, rapid and efficient way.

In order to realize, among other things, the objects mention above the present invention is characterised by what is presented in the characterising parts of the enclosed independent claims.

The embodiments and advantages mentioned in this text apply, when applicable, to the inventive methods, to the inventive cellular board as well as to an inventive production line, even if it is not always specifically mentioned.

A cellular board comprises first and second substantially parallel surface plates and a core structure between them. A typical cellular board according to the invention is manufactured by fastening to each other a number of separate boards, which are made of a plate-like material, i.e. profiles which are also called lamellae in this application. In a completed cellular board each single profile is intended to form
    a substantially planar first surface projection,
    a substantially planar second surface projection,
    a core, which is arranged to interconnect the first and second surface projections.

The profiles of a cellular board according to the invention are fastened to each other so that
    the first surface projections lie side by side and form the first surface plate of the cellular board,
    the second surface projections lie side by side and form the second surface plate of the cellular board, and
    the profile cores are fastened to the first and second surface projections, whereby they form the core structure of the cellular board.

The invention can be applied in the manufacture of cellular boards used for instance in middle decks of ships or in intermediate floors, walls, ceilings and floors of high-rise buildings. Very strong and light load-bearing structures can be made of a cellular board according to the invention. For instance, cellular board according to the invention can be used as structures in cabin or room modules of ships or buildings. Then for instance a cabin module can be easily made as a self-supporting structure, on top of which it is possible to build even several stories. Such modules can for instance form a ship's self-supporting cabin section or a high-rise building.

Different profiles and cellular boards according to the invention can be easily manufactured to suit the situation at hand. Cellular boards of different size and thickness are manufactured easily. The profiles can be for instance steel, aluminium or some other suitable metal. Also other materials may come into question. The plate-like material and the profiles made of it can be coated on one side or on both sides, for instance with a PVC film. The thickness of the plate-like material can be for instance 0.5 to 5 mm, or 0.5 to 3 mm. The length of the profiles in the so-called core direction can be for instance 0.5 to 20.0 m or 1.0 to 10.0 m. The width of the surface projections can be for instance 0.1 to 1.0 m, 0.1 to 0.5 m, or 0.1 to 0.2 m. The distance between the surface projections of a single profile can be for instance 0.1 to 0.5 m, 0.05 to 0.4 m, or 0.1 to 0.3 m. The thickness of a finished cellular board is generally approximately equal to the distance between the surface projections in a single profile. A finished cellular board can contain for instance 5 to 1000, 10 to 200 or 20 to 100 profiles fastened side by side. In the direction bearing more forces the length or the size of a finished cellular board is generally approximately equal to the profile length in the so-called core direction. The width of a cellular board in the direction perpendicular to the core direction can be for instance 0.5 to 50 m, 1 to 25 m or 5 to 20 m. The dimensions mentioned above are only examples. Other dimensions are also possible.

Now it was surprisingly found that strong cellular boards can be manufactured from separate profiles or lamellae, which are much smaller than the finished cellular board, by attaching several profiles side by side. Thus a number of relatively narrow plates attached to each other, or the surface projections of single profiles, form the surface plates of a cellular board.

Because single profiles are of a small size compared to a finished cellular board it is easy to handle, store and transport the raw materials.

One of the greatest advantages of the invention is that it is easy to fasten the profiles according to the invention. Many known prior methods can be used to fasten the profiles. It is always possible to select a suitable method among the available methods. Thus even a large cellular board can be manufactured easily and economically.

In one embodiment of the invention a single profile is made of a single thin metal plate. Edges, depressions, protrusions, folds or other shapes are arranged in the thin metallic plate by some method known as such. An advantageous method to shape the profiles are different cold forming methods, for instance roll forming or edging. The profiles can be rapidly and economically made of thin plate.

In an embodiment of the invention mutually fitting fixing folds have been arranged in the surface projections or cores, whereby the profiles to be placed next to each other are fastened by locating the fixing folds against each other. The fixing folds can be made by the same method and even simultaneously with the edges, depressions, protrusions, folds or other shapes mentioned above. With the aid of the mutually fitting fixing folds it is easy to locate the profiles against each other in the desired mutual position.

In an embodiment of the invention the adjacent profiles are further fastened to each other at the fixing folds located opposite each other with the aid of one or more of the following fixing members known as such:
  machine seam
  glue
  rivet
  screw
  welded seam.

In this way the joints between the profiles will become very strong and firm. For instance, at the same fixing fold the adjacent profiles can be first glued to each other and then the joint can be further secured by fixing the profiles to each other with screws or rivets.

In an embodiment of the invention a first fixing fold is formed at the first end of the first surface projection, and a second fixing fold fitting into the first fixing fold is formed at the second end of the first surface projection. A fixing fold in a profile forming one core of the cellular board is typically also arranged in connection with the fixing folds of two adjacent surface projections.

The fixing folds can be formed so that the fixing folds formed at the ends of three different profiles can be fixed to each other at one connection point. When a cellular board is assembled the fixing folds of the profiles forming two adjacent surface projections and one core of the cellular board are attached and fastened to each other. The fixing can be easily made for instance by machine seaming known as such.

In this text the term press seaming is sometimes also used for machine seaming, and the term press seaming device for a machine seaming device.

Machine i.e. press seaming is a technique known as such to a person skilled in the art.

In an embodiment of the invention the fixing fold of each profile to be joined comprises two-fold bent metal plate. When three such interlaced fixing folds are machine seamed together a six-fold machine seam of metal is achieved at the profile joint. A joint of this kind is very strong.

In an embodiment of the invention the first and second surface projections are arranged to be substantially parallel. When the profiles are fastened to each other so that adjacent surface projections are placed in parallel, it is easily obtained a cellular board where the first and second surface plates are quite even. The surface projections of a single profile are typically equally long, i.e. the distance between the first and second ends of the first surface projection is approximately equal to the distance between the first and second ends of the second surface projection.

In an embodiment of the invention the cross-section of a single profile has a substantially symmetric form. Profiles of this kind are easy to install.

In an embodiment of the invention the first and second surface projections are substantially identical in their form, or mirror images of each other. Such profiles are easy to install. An advantageous cellular board is at least mainly formed of profiles of only two types, of which the first profiles are arranged as surface projections and the second profiles as cores.

In an embodiment of the invention the core is fastened between the first and second surface projections, so that a cross-section of some part of the cellular board has substantially the form of the letter Z. "Substantially the form of the letter Z" means for instance that the core interconnects the first and second surface projections at their opposite ends. The Z-forms can vary. The angle between a surface projection and the core can for instance be approximately 90 degrees or something between 45 and 135 degrees.

In another embodiment of the invention the cross-section of two surface projections and the core interconnecting them has a U-form or a Π-form, whereby the first end of the first surface projection is attached via the core to the first end of the second surface projection. A form like this is typically symmetric regarding the axis transversally crossing the core. The form thus obtained can have sharp corners, or its corners can be rounded. It is also possible that the joint between the first surface projection and the core is sharp and the joint between the second surface projection and the core is rounded. The angle between the surface projection and the core is then generally very close to 90 degrees or exactly 90 degrees.

A cellular board can comprise surface projections and cores arranged both in Z-form and U-form.

In an embodiment of the invention the core or a part of it can be shaped with small folds in zigzag form, or it can be wave-formed. The folds or waves can be arranged either in the profile's core direction or against it.

In an embodiment of the invention elongated reinforcing shapes are arranged in the first surface projection or in the second surface projection or in the core, or in all of them, such as depressions, grooves, projections or protrusions made by cold forming, for instance roll forming. The reinforcing shapes can be arranged in the surface projections and in the core in an angle of 90 degrees to the profile's core direction, or in the core direction. The reinforcing shapes in the surface projections and in the core can have different directions, for instance so that the reinforcing shapes in the surface projections may be in an angle of 90 degrees to the core direction, and in the core in the core direction. The reinforcing shapes can be formed so that they begin at a first distance from the first end of the surface projection, and they are formed to continue up to a point at a second distance from the joint between the surface projection and the core. The first distance and the second distance can be different, however so that the reinforcing shape advantageously comprises the main part of the distance between the first end of the surface projection and the joint. In some cases the length of the reinforcing shape is substantially equal to the distance between the first end of the surface projection and the joint, or regarding the core it can be substantially equal to the distance between the joints.

In an embodiment of the invention the profile comprises in a single piece
   a part of the first surface plate of a finished cellular board,
   a part of the second surface plate of a finished cellular board,
   a part of the core structure of a finished cellular board.

In an embodiment of the invention the cellular board comprises at least two types of profiles according to the invention. Then a cellular board can be manufactured of for instance U-profiles, of which every other comprises reinforcing shapes, and every other does not have any reinforcing shapes. In this way the strength of the cellular board can be adjusted in an easy and simple way so that it corresponds to the intended use. The direction of the reinforcing shapes can also be different in the different profiles of a cellular board. A cellular board can also comprise profiles with both a Z-form and a U-form.

Cellular board according to the invention can be manufactured from a steel plate strip by a method comprising at least the following steps:
   roll forming of fixing folds with a roll forming machine into steel plate blanks having a certain width and length and made from the steel plate strip, and thus the forming of the blanks into lamellae,
   the lamellae are sorted according their assembly order,
   the fastening of the lamellae to each other at their fixing folds,
   the machine seaming of the fixing folds of the lamellae pre-fastened to each other in a machine seaming device, so that they are firmly fixed to each other and so that the lamellae fixed to each other form surface plates and core structure of a cellular board, whereby cellular board elements are formed in this way.

Cellular boards or cellular board elements according to the invention can be manufactured of steel plate strip in a production line comprising at least
   a roll forming machine in order to make fixing folds into steel plate blanks made of the steel plate strip and having a certain width and length, and thus to transform the blanks into lamellae,
   a machine seaming device in order to firmly fix to each other the fixing folds of the lamellae pre-fastened to each other, so that the lamellae fixed to each other form surface plates and core structure of a cellular board.

A typical system according to the invention for manufacturing cellular board from lamellae comprises at least the following parts
   a cellular board assembly table,
   a press seaming device arranged in connection with the assembly table, and
   means for feeding lamellae to the press seaming device.

According to advantageous embodiments of the invention the system can further comprise at least one of the following features or additional components
   means for feeding the lamellae to the press seaming device are arranged in the press seaming device,
   the press seaming device is arranged to be movable in relation to the assembly table,
   the press seaming device has at least two press seaming means, which advantageously comprise press rolls and seaming rolls,
   an insulation treatment device for arranging insulation within the press seamed lamellae, to which the insulation is typically attached with glue, and/or
   means for arranging substance insulating the seam in gaps of at least some of the lamellae before these lamellae are press seamed.

In a system according to the invention three lamellae are fed to the press seaming device at the same time, i.e. the lamellae that form the surface parts and the core part of a cellular board element.

The process can be made even faster and more efficient if the means for feeding lamellae to the press seaming device are arranged in the press seaming device and if the press seaming device is arranged to be movable in relation to the assembly table. Then it is possible to use the system according to the invention so that when the press seaming device has press seamed the lamellae to each other, i.e. when it has moved from the first end of the assembly table to its second end, then it transports the next lamellae to the correct processing position as it returns to its original position. Then the press seaming device can immediately begin a new seaming cycle, i.e. it can again move from the first end of the assembly table to its second end and simultaneously seam all necessary seams. The seams in question are typically for instance the top and bottom seams of a lamella.

The press seaming device can of course have any suitable number of press seaming means, such as two, three, four, five, six, seven, eight, nine or ten means.

When an embodiment of the invention utilizes means to arrange substance for seam insulation in gaps between at least some of the lamellae before these lamellae are press seamed, i.e. machine seamed, then the seams can be made hermetic at the same time. The substance for seam insulation can be for instance glue, such as urethane glue.

A system or a production line according to the invention can further comprise further equipment means, such as a further equipment table, onto which cellular board elements of a desired size are moved from the assembly table. The cellular board elements are finished on the further equipment table; for instance further equipment, edge strips, required bores etc. are made in this step.

A typical method according to the invention for manufacturing cellular board of lamellae is characterised in that the method comprises at least the following steps
a) arranging of the first lamellae on the assembly table,
b) press seaming or machine seaming of lamellae to each other with a press seaming device so that the lamellae fixed to each other form surface plate and core structure of a cellular board element,
c) arranging of second lamellae in connection with the first lamellae,
d) press seaming or machine seaming of the second lamellae to each other and to the lamellae fixed to each other in the first step with a press seaming device so that they form more surface plate and core structure of the cellular board element,
e) repeating of the steps c) and d) until they provide a cellular board element of the desired size.

According to an embodiment of the invention at least three lamellae, i.e. the lamellae forming the first and second surface parts and the core part of a cellular board element are press seamed to each other in a single step. Then it is possible to form all seams between these at the same time.

A typical load-bearing planar building structure according to an embodiment of the invention comprises
  a first planar cellular board, where the cores are arranged mainly in a first direction,
  a second planar cellular board, where the cores are arranged mainly in a second direction,
  a planar insulation layer fixed between the first and second cellular boards.

The first and second cellular boards and the insulation layer between them are arranged mainly in parallel, whereby the surfaces of the first and second cellular boards directed away from the insulation layer form the outer surfaces of the structure.

In an embodiment of the invention the first direction is mainly in the direction of the plane of the first planar cellular board and the second direction is mainly in the direction of the plane of the second planar cellular board.

In an embodiment of the invention the first direction and the second direction form a substantial angle between them. Thus the cellular boards of the structure have differently directed cores. This strengthens the structure. In an embodiment of the invention the first direction and the second direction are substantially perpendicular to each other. Then the structure is particularly strong.

In an embodiment of the invention the first and second cellular boards are cellular boards of steel.

For instance, when the structure according to the invention is used as the base floor of a building, it is possible to fasten an elongated pile to the outer surface of the cellular board. Typically the pile is arranged to be substantially perpendicular to the plane direction of the first cellular board.

In an embodiment of the invention the pile is fastened through a pile cap to the outer surface of the first cellular board. Such a pile cap is arranged to contact the outer surface of the first cellular board so that the pile cap distributes the load applied by the pile against the first cellular board over an area, which is larger than the area of the end of the pile, or over the contact area of the pile cap. The contact area of the pile cap is substantially larger, advantageously more than 100% larger, or still more advantageously more than 300% larger than the area of the end of the pile fastened to the pile cap, as projected on the plane of the first cellular board.

In an embodiment of the invention the pile cap is arranged to contact the outer surface of the first cellular board at least mainly only at the outer edges of the pile cap's contact area. An arrangement of this kind distributes the forces directed by the pile to the cellular board over a large area of the cellular board.

In an embodiment of the invention the pile cap consists of mainly plate-like material in the part interconnecting the outer surface of the first cellular board and the pile. The direction of the plane of this plate-like material differs at least mainly from the direction of the plane of the first cellular board. This plate-like material can have the form of for instance mainly a cone or a pyramid with its bottom against the cellular board.

BRIEF DESCRIPTION OF THE FIGURES

The invention will be described in more detail below with reference to the enclosed schematic drawing, in which

FIG. 2 shows the cross-section of a cellular board according to the first embodiment of the invention;

FIG. 3 shows the cross-section of a cellular board according to the second embodiment of the invention;

FIG. 8 shows the cross-section of a cellular board according to the fifth embodiment of the invention;

FIG. 9 shows a manufacturing step of the cellular board in FIG. 6;

FIG. 10 shows another manufacturing step of the cellular board in FIG. 6;

DETAILED DESCRIPTION

Figure 1:
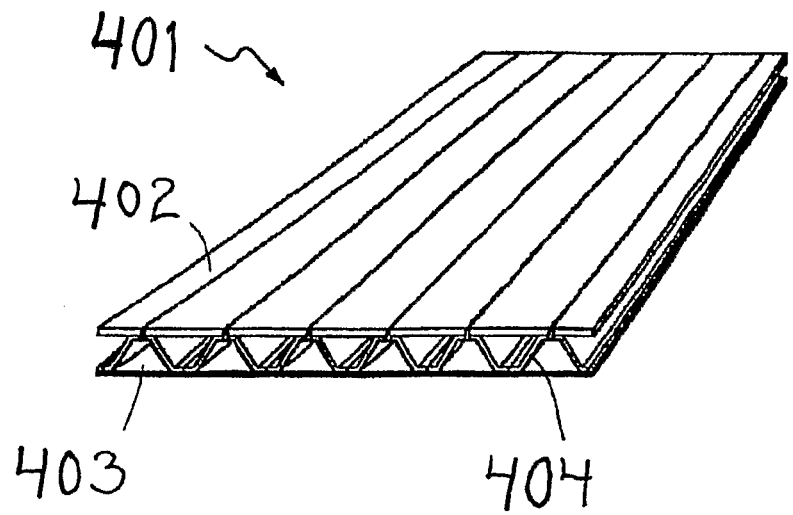
FIG. 1 shows a basic presentation of a known prior art cellular board.

The same reference numerals are used for corresponding features in different embodiments. In some figures describing the invention the components are presented with untrue dimensions for the sake of clarity. For instance, the gaps between the profiles are generally exaggerated.

FIG. 1 shows a prior art cellular board 401. The cellular board 401 comprises a first surface plate 402 and in parallel with it a second surface plate 403. Separate core structures 404 have been welded between the surface plates.

FIG. 2 shows in a basic presentation a part of a cellular board 1 according to the invention. The cellular board 1 is assembled from a number of metal profiles 5 in Z-form. Each profile 5 comprises a first surface projection 6 and in parallel with it a second surface projection 7. The surface projections are joined by a single-piece core part 4 that forms an integral part with them. The profile 5 is bent from a planar metal plate, for instance by roll forming or edging first and second folds 8 and 9 to it. The first fold 8 is between the first surface projection 6 and the core part 4. The second fold 9 is between the second surface projection 7 and the core part 4. The core part 4 is bent approximately at a right angle regarding the surface projections. When the profiles are fixed to each other, for instance by welding at their contact points 10, the first surface projections form the first surface plate 2 of the cellular board and the second surface projections form the second surface plate 3 of the cellular board.

The cellular board 1 of FIG. 3 corresponds otherwise to that of FIG. 2, but the ratio of the length of the core 4 to the length of the surface projections 6 and 7 is substantially greater than that in FIG. 2. Although the profiles 5 of both figures are made of a metal strip with the same thickness the cellular board 1 of FIG. 3 provides a substantially increased strength.

Figure 4:
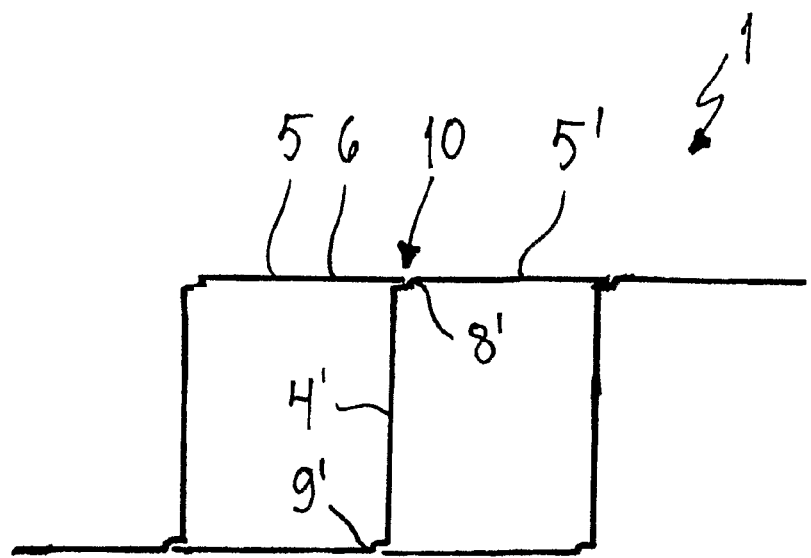
FIG. 4 shows the cross-section of a cellular board according to the third embodiment of the invention.
Figure 5:
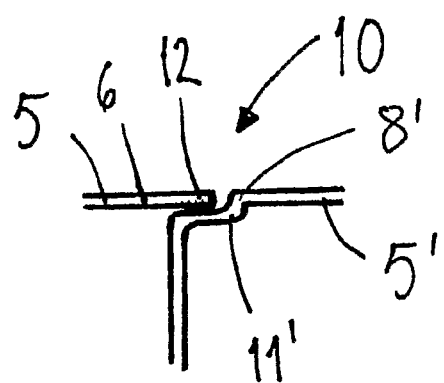
FIG. 5 shows an enlarged view of a part of the cellular board in FIG. 4.

The cellular board 1 shown in FIG. 4 is formed by a number of mutually identical and symmetric profiles 5, 5'. FIG. 5 shows in an enlarged view the contact point 10 between two profiles 5, 5'. At the contact point 10 a first fixing fold 11' is formed in the first fold 8' of the first profile 5'. The end 12 of the first surface projection 6 in the second profile 5 fits into the fixing fold so that the adjacent surface projections 6 and 6' will be in the same plane. The adjacent profiles 5 and 5' can for instance be welded to each other at the contact point 10, between the end 12 of the surface projection 6 and the fixing fold 11' located against each other. The other fixing locations between the profiles are arranged in a corresponding way.

Figure 6:
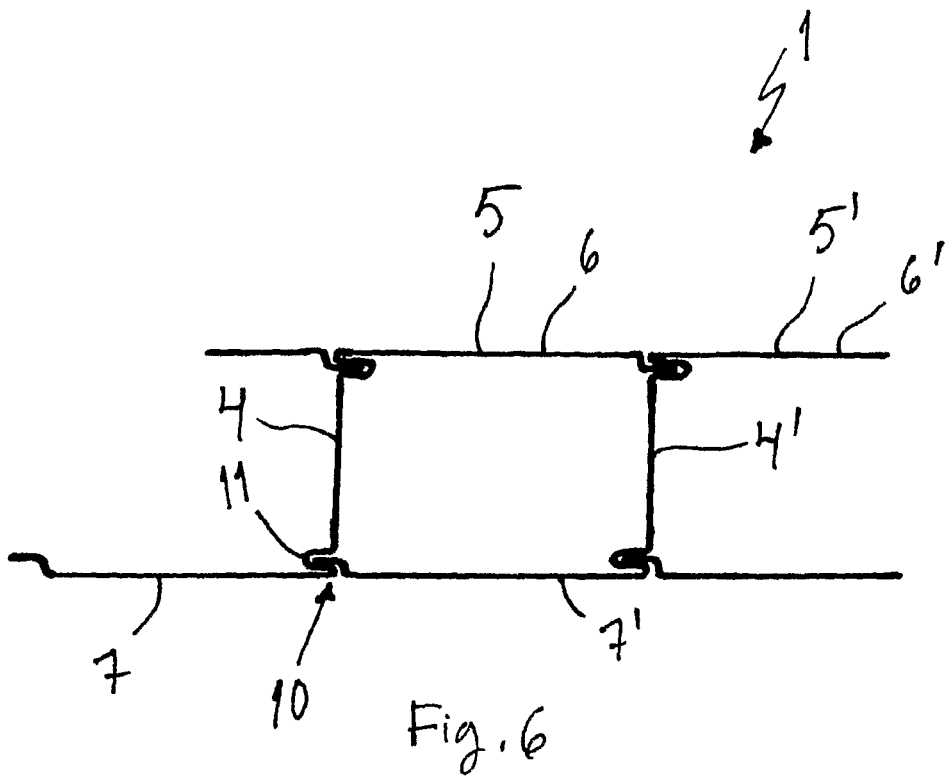
FIG. 6 shows the cross-section of a cellular board according to the fourth embodiment of the invention.
Figure 7:
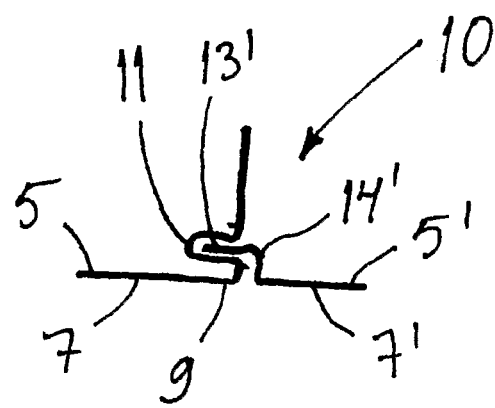
FIG. 7 shows an enlarged view of a part of the cellular board in FIG. 6.

The cellular board 1 shown in FIG. 6 is formed of a number of mutually identical and symmetric profiles 5, 5'. FIG. 7 shows in an enlarged view a contact point 10 between two profiles 5 and 5'. At the contact point 10 there is formed a groove-like first fixing fold 11 in the second fold 9 of the first profile 5. A second fixing fold 14' is formed at the end 13' of the second surface projection 7' of the second profile 5'. The end 13' fits into the first fixing fold 11 so that the adjacent second surface projections 7 and 7' will be in the same plane. The adjacent profiles 5 and 5' can for instance be glued to each other at the contact point 10, between the end 13' and the fixing fold 11 located against each other. The other fixing locations between the profiles are arranged in a corresponding way.

FIG. 8 shows how a cellular board 1 is formed of a number of mutually identical and symmetric profiles 5, 5'. In the first fold 8 of the first profile 5 at the first contact point 10 there is formed a first fixing fold 11 comprising a groove 15 and a projection 16 located adjacent to each other. At the end 13' of the first surface projection 6' of the second profile 5' there is formed a hook-like second fixing fold 14'. The fixing fold 14' fits into the groove 15 and the projection 16 so that the adjacent first surface projections 6 and 6' will be located in the same plane after fixing.

A third fixing fold 22' comprising a depression 23' is formed close to the second fold 9' of the second profile 5' at the second contact point 10' of FIG. 8. At the end 24 of the second surface projection 7 of the first profile 5 there is formed a hook-like fourth fixing fold 25. The fixing fold 25 fits into the groove 23' so that the adjacent second surface projections 7 and 7' will be located in the same plane after fixing.

FIG. 9 shows in an enlarged view the first contact point 10 shown in FIG. 8, and how the profiles 5 and 5' are fixed there by machine seaming. The groove 15, the projection 16 and the fixing fold 14' are pressed in the direction shown by the arrow against a stationary punching knife 20. Thus the profiles 5 and 5' made of thin plate are fixed to each other.

FIG. 10 shows in an enlarged view the second contact point 10' shown in FIG. 8, and how the profiles 5 and 5' are fixed there by machine seaming. The groove 23' and the fixing fold 25 are pressed in the direction shown by the arrow against a stationary punching knife 20. Thus the profiles 5 and 5' made of thin plate are fixed to each other.

Figure 11:
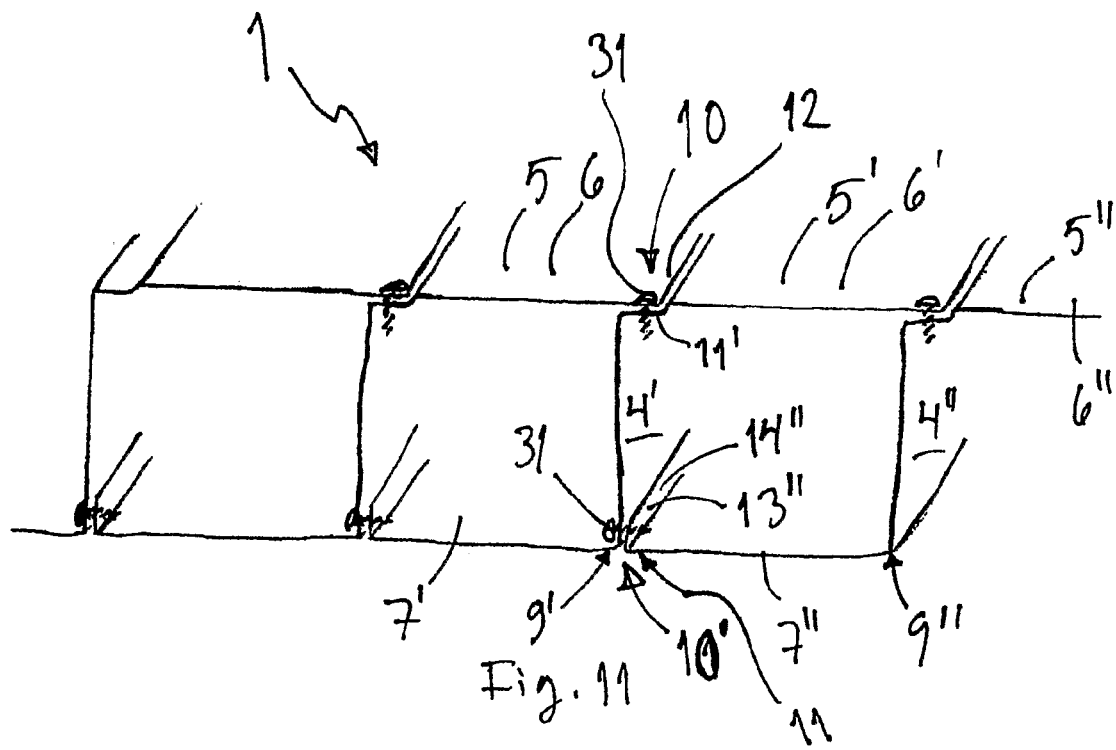
FIG. 11 shows the cross-section of a cellular board according to the sixth embodiment of the invention.

FIG. 11 shows a cellular plate 1 similar to the cellular board of FIG. 4, whereby this board is formed of a number of mutually identical and symmetric profiles 5, 5', 5". At the first contact point 10 a first fixing fold 11' is formed in the first fold 8' of the profile 5'. The end 12 of the first surface projection 6 of the profile 5 fits into the fixing fold so that the adjacent surface projections 6 and 6' will be in the same plane. The adjacent profiles 5 and 5' can for instance be welded or glued to each other so that they are fixed at the contact point 10, between the end 12 of the surface projection 6 and the fixing fold 11' located against each other. A screw or a rivet 31 is also arranged through the end 12 and the fixing fold 11' in order to secure the joint.

At the second contact point 10' of FIG. 11 a fixing fold 14" is formed in the end 13" of the second surface projection 7" of the profile 5". The fixing fold 14" is arranged against the core part 4' of the adjacent profile so that the adjacent second surface projections 7' and 7" will be in the same plane. The adjacent profiles 5 and 5' can for instance be welded or glued to each other at the contact point 11, between the fixing fold 14" and the core part 4' located against each other. A screw or a rivet 31 is also arranged through the fixing fold 14" and the core part 4' in order to secure the joint. The other fixing points between the profiles of FIG. 11 are arranged in a corresponding way.

Figure 12:
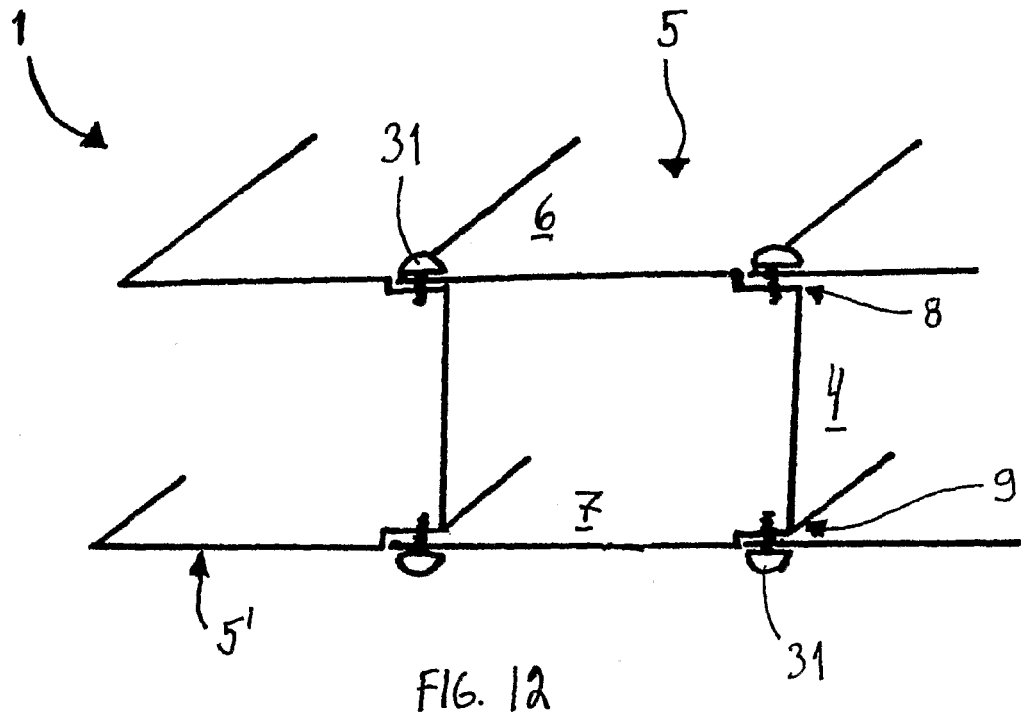
FIG. 12 shows the cross-section of a cellular board according to the seventh embodiment of the invention.

FIG. 12 shows the cross-section of a cellular board according to the seventh embodiment of the invention. The cellular board 1 is assembled from a number of metal profiles 5, 5' having a form of the letter U. Each profile 5, 5' comprises a first surface projection 6 and a parallel second surface projection 7. The surface projections are interconnected by a core part 4 that forms an integral part with them. The profile 5 is bent from a planar metal plate, for instance by roll forming or edging first and second folds 8, 9 to it. The first fold 8 is between the first surface projection 6 and the core part 4. The second fold is between the second surface projection 7 and the core part 4. The core part 4 is bent approximately at a right angle to the surface projections. When the profiles are fixed to each other, for instance by welding and/or by screws or a rivet 31 at their contact points, the first surface projections form the first surface plate of the cellular board and the second surface projections form the second surface plate of the cellular board.

Figure 13:
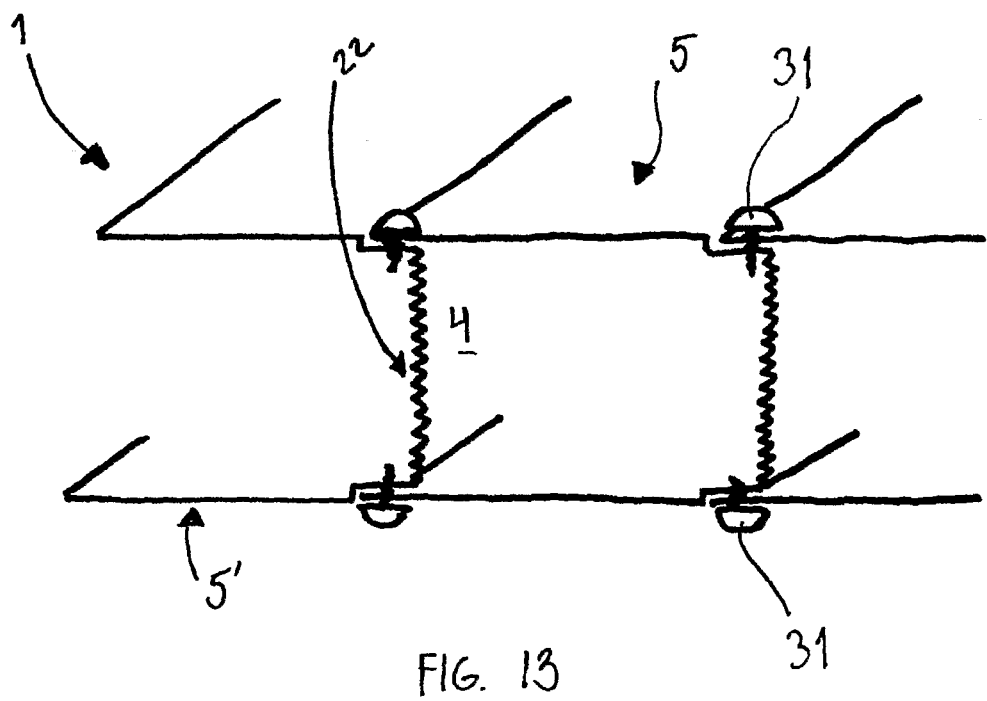
FIG. 13 shows the cross-section of a cellular board according to the eighth embodiment of the invention.

FIG. 13 shows a cellular board 1 similar to that of FIG. 12, which board 1 is formed of a number of mutually identical and symmetric U-profiles 5, 5'. In a single profile the core part 4 is shaped to have folds 22 in zigzag form. The folds can cover the whole distance in the core direction, i.e. from the first outer edge of the core to its second outer edge. With the aid of the folds it is possible to change the strength and flexibility characteristics of the profiles and thus those of the cellular board as required.

Figure 14:
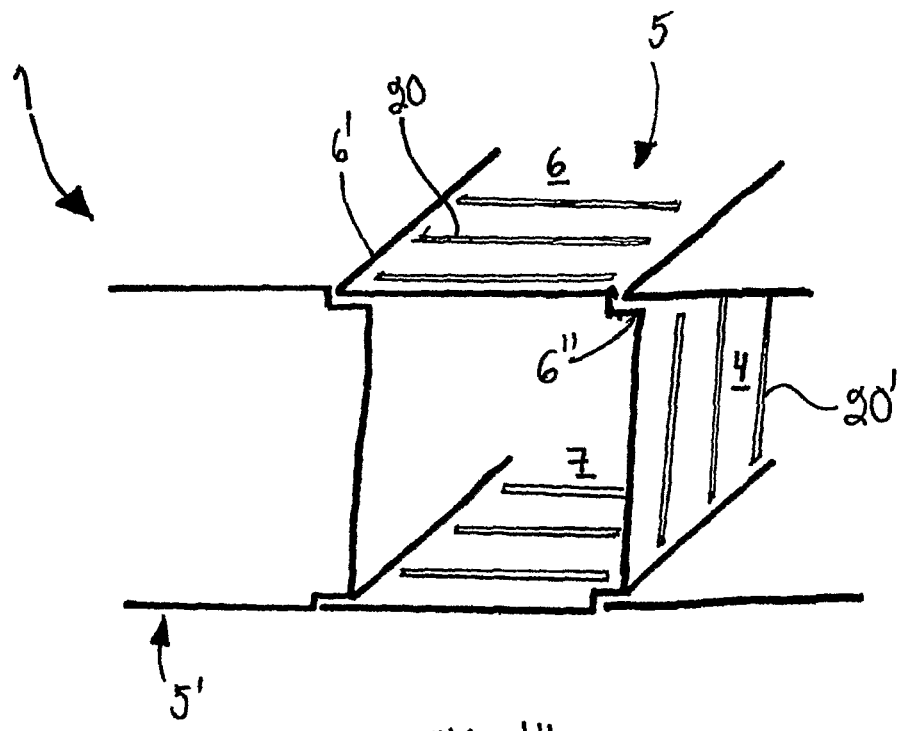
FIG. 14 shows the cross-section of a cellular board according to the ninth embodiment of the invention.

FIG. 14 shows the cross-section of a cellular board according to the ninth embodiment of the invention. The cellular board 1 is formed of a number of metal profiles 5, 5' having the form of the letter U. Each profile 5, 5' comprises a first surface projection 6 and a parallel second surface projection 7, the surface projections being interconnected by a core part 4 that forms an integral part with them. Elongated reinforcing shapes 20, 20' have been formed in the profile 5, both in the surface projections 6, 7 and in the core 4 of the cellular board 1. The reinforcing shapes have been formed for instance by roll forming or edging. The reinforcing shapes 20, 20' have been formed both in the surface projections 6, 7 and in the core so that they are against the core direction. The reinforcing shapes 20, 20' have been formed so that they begin at a first distance from the first end 6" of the surface projection 6, and so that they continue up to a second distance from the joint 6" between the surface projection 6 and the core 4. For the sake of clarity FIG. 14 does not show the fastening of the profiles 5 to each other.

Figure 15:
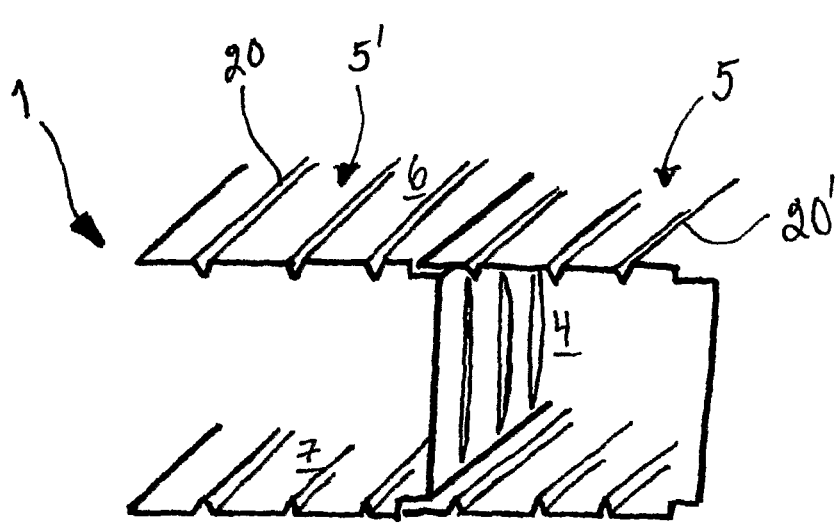
FIG. 15 shows the cross-section of a cellular board according to the tenth embodiment of the invention.

FIG. 15 shows a cellular board 1 similar to that of FIG. 14, whereby the board is formed of a number of mutually identical U-profiles 5, 5' with reinforcing shapes 20, 20' formed in them. In the surface projections 6, 7 the reinforcing shapes 20, 20' have been formed to be in parallel with the core direction, and in the core 4 they are formed to be against the core direction. For the sake of clarity FIG. 15 does not show the fastening of the profiles 5 to each other.

Figure 16:
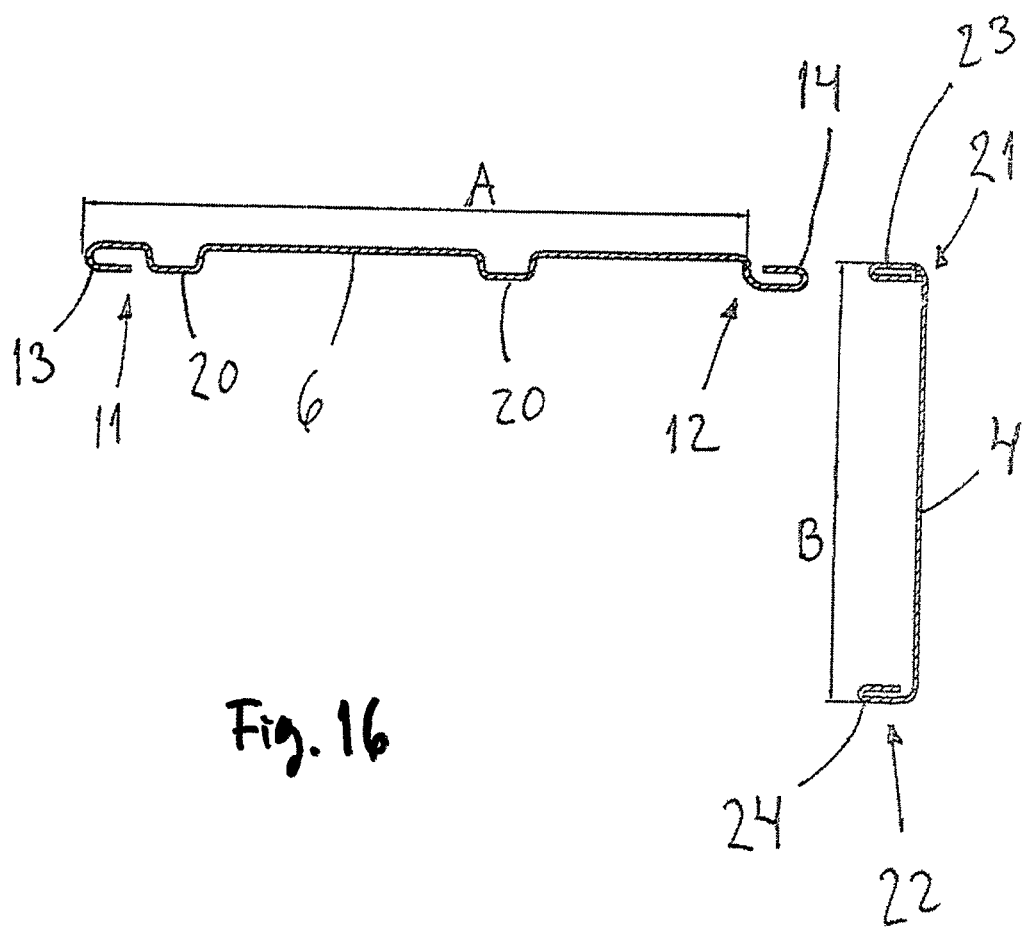
FIG. 16 shows the cross-section of the surface projection and core according to the eleventh embodiment of the invention.

FIG. 16 shows a surface projection 6 and a core 4 according to the invention. The profiles or lamellae 4 and 6 have been formed from a planar metal strip by roll forming fixing folds in their longitudinal edges and reinforcing shapes 20 in the longitudinal direction of the profile between the edges of the surface projection 6. A fixing fold 13 is located at the first edge 11 of the surface projection 6 and a fixing fold 14 is located at the second edge 12 of the surface projection. A fixing fold 23 is located at the first edge 21 of the core 4 and a fixing fold 24 is located at the second edge 22 of the core.

Figure 17:
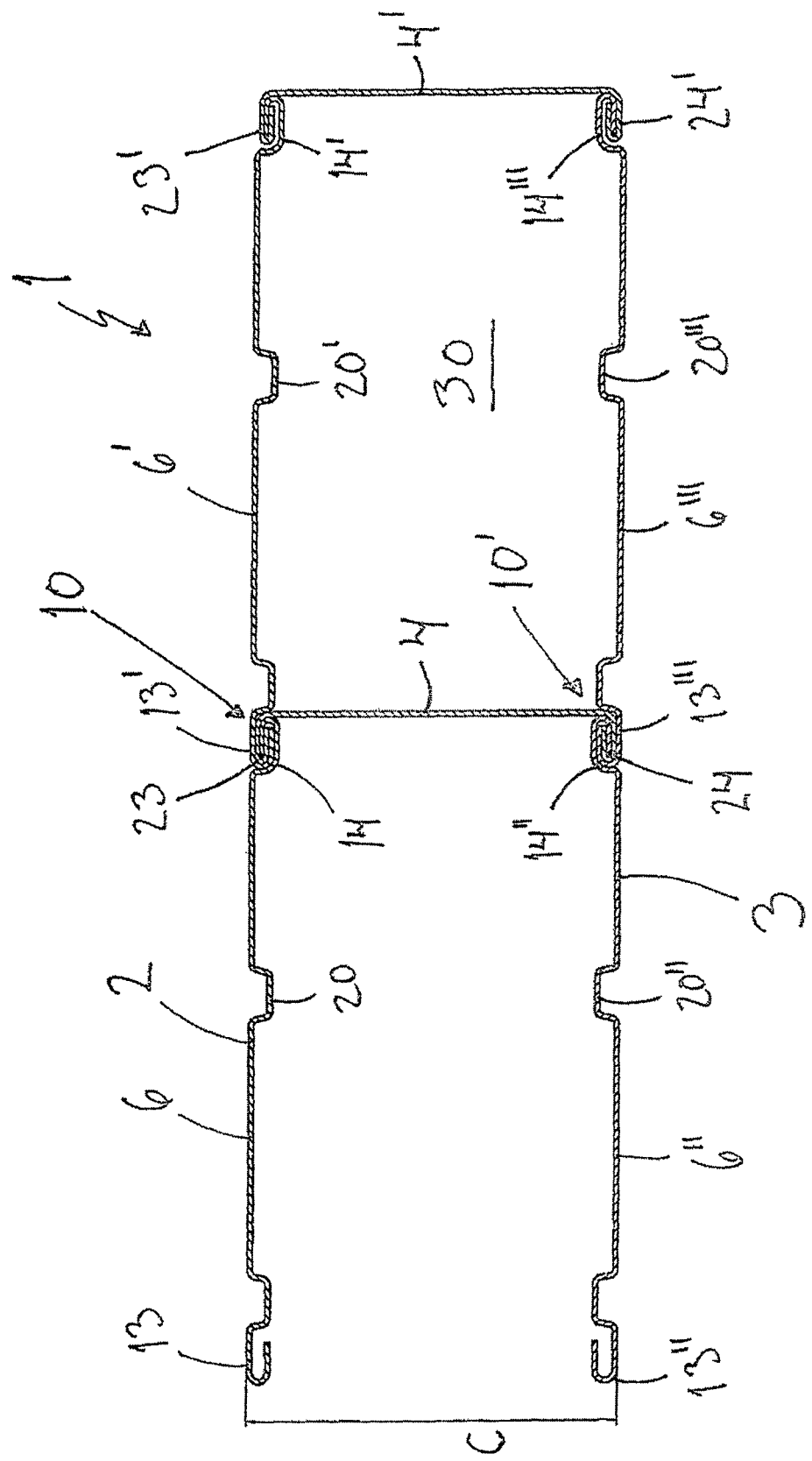
FIG. 17 shows the cross-section of a part of the cellular board according to the twelfth embodiment of the invention.

FIG. 17 shows an example of how a cellular board 1 is formed from separate profiles, i.e. from surface projections 6, 6', 6", 6'" and cores 4, 4'. The fixing fold 14 of the second edge of the surface projection 6, the fixing fold 13' of the first edge of the surface projection 6', and the fixing fold 23 of the first edge of the core 4 are fitted into each other at the contact point 10. In a similar way the fixing fold 14" of the second edge of the surface projection 6", the fixing fold 13'" of the first edge of the surface projection 6'", and the fixing fold 24 of the second edge of the core 4 are fitted into each other at the contact point 10'. The profiles are fixed to each other by machine seaming at the contact points 10 and 10'. Then the surface projections 6 and 6' form the first surface plate 2 of the cellular board 1, and the surface projections 6" and 6'" form the second surface plate 3 of the cellular board 1. At the fixing points the material to be pressed together is six-fold.

FIGS. 16 and 17 show that the surface projections located against each other, such as 6 and 6", have an identical form. The surface projections 6 and 6" have only been mounted in a mutually opposite position. Thus a cellular board 1 is formed using profiles of only two different forms—one for the surface projections and the other for the cores.

The width or the advance A of a surface projection drawn in FIG. 16 can be for instance about 0.15 m. The width B of a core drawn in FIG. 16 can be for instance about 0.9 m. The thickness C of the whole cellular board 1 drawn in FIG. 17 would then be approximately B plus the thickness of two metal plates in use, in other words for instance 0.095 m.

During assembly it is possible to install insulation in the space 30 within the cellular board. The insulation can be for instance board of mineral wool, which substantially totally occupies the space 30. In one space 30 it is possible to arrange a piece of mineral wool having a cross-section of approximately rectangular form. This insulation can have dimensions, which for instance are A times B using the above presented dimensions. In a direction transversal to the cross-section shown in the figures the insulation can be for instance as long as the whole cellular board or the profiles 4 and 6.

Figure 18:
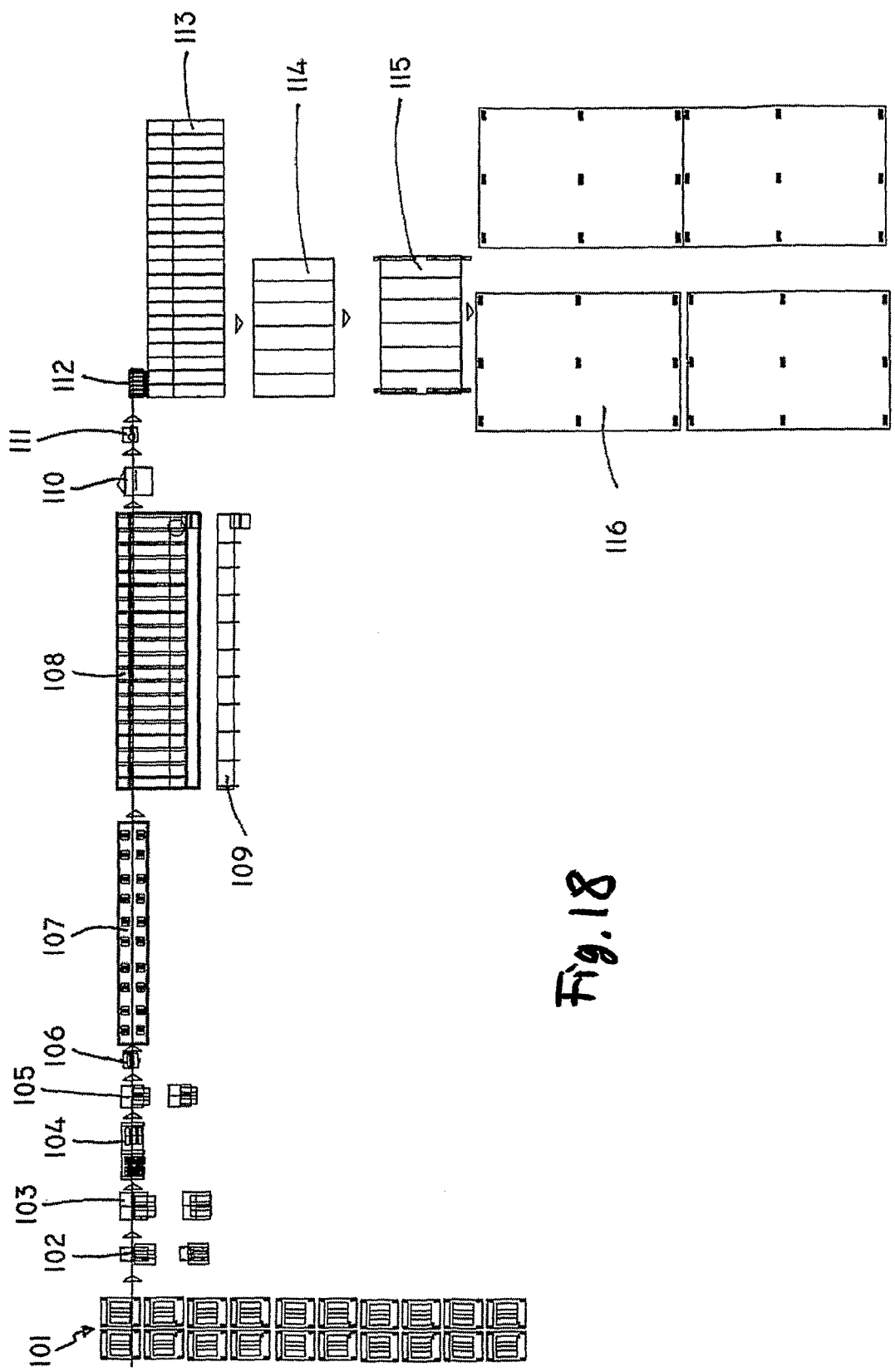
FIG. 18 shows a production line according to the invention.

FIG. 18 shows a production line according to the invention for producing cellular steel board element of steel plate strip. Typically at least the main part of the devices of the production line according to the invention, and preferably all devices are located within the same building. The production line functions in the following way:

Rolls of steel plate strip are stored in a storage 101. The storage contains many rolls. When required, the steel plate rolls are transported with roll transport equipment 102 from the storage to the mother winding reel 103. Steel plate is reeled out from the mother winding reel to a strip slitter 104. The strip slitter slits the steel plate into plate strips with the width and thickness determined by the desired cellular board element in question. For instance, if the width B of the core 4 mainly determining the thickness of the desired cellular board is 100 mm, then the width of the required core strip is 100 mm+the amount of material required by the fixing folds 23 and 24, in other words the material required by the machine seaming.

The strips slit by the slitter 104 are transported to a second winding reel 105. If required it is also possible to make strips of different widths and store them in the storage. The slit strips are reeled out from the second winding reel 105 to a strip cutting device 106. The cutting device 106 cuts the strip into steel plate blanks with a desired length. The strip is cut at a length determined by the length of the required cellular board.

Then the steel plate blanks are transported from the cutting device 106 to a roll forming machine 107. The roll forming machine 107 roll forms fixing folds 13, 14, 23, 24 (see FIGS. 1 & 2) in the blanks, as well as any other shapes, such as reinforcing folds 20. Thus the blanks are formed into lamellae or profiles, which form a cellular board. The width of a lamella 6, 6' forming the surface plate 2, 3 of the cellular board determines the advance A of the plate field and the distance between the cores 4, 4'. The width B of a lamella 4, 4' forming the core structure determines the thickness C of a completed cellular board, and thus also its strength. Typically the wider the core, the more rigid and the stronger cellular board obtained.

From the roll forming machine 107 the lamellae are moved to the lamella sorting table 108. The lamella sorting table is needed as a sorting and storage space for the lamellae. On the sorting table 108 the lamellae are sorted corresponding to their assembly order. The sorted lamellae are transported from the sorting table 108 to a lamella pre-assembly table 109. On the pre-assembly table the lamellae are pre-fastened to each other at the fixing folds before the seaming. At this stage it is for instance possible to pre-fasten one profile blank, in other words two surface lamellae 6 and 6" and a core lamella 4 interconnecting them.

The lamellae pre-fastened to each other are moved forward from the pre-assembly table 109 either to a gluing device 111, to an insulation treatment device 110, or to the cellular board assembly table 113.

The gluing device 111 can for instance press urethane glue into the gaps between the pre-fastened lamellae, for instance before machine seaming into the seam to be machine seamed. This can provide a hermetic cellular board and increase the strength of the cellular board.

With the insulation treatment device 110 it is possible to arrange insulation into at least a part of the lamellae or into the gaps between the lamellae. The insulation is mounted within a previously machine seamed cellular section, for instance before the installation and machine seaming of the next pre-assembled profile blank. The insulation can be glued between the lamellae when required.

On the cellular board assembly table 113 the lamellae pre-fastened to each other are machine seamed with the machine seaming device 112 so that they will be firmly fixed to each other at their fixing folds, and thus parts of a cellular board element are formed. The machine seaming device 112 is typically arranged to be movable along one side of the assembly table 113, for instance on rails. It is for instance possible to act in the following way: An already seamed cellular board element is pushed on the assembly table over the width of a lamella, after which new pre-assembled lamellae are brought to seaming. The number of lamellae seamed side by side together determines the width of the cellular board.

Cellular board elements of the desired size are moved from the assembly table 113 to a further equipment table 114 of the cellular board element. On the further equipment table 114 the cellular board is finished, for instance further equipment, edge strips, required bores etc. are made in this step. The finished cellular board elements are moved with the cellular board element lifting device 115 from the further equipment table 114 to a storage 116 for cellular board elements. A typical lifting device 115 lifts a finished cellular board element and at the same time supports it at its ends, which may be open. In the storage 116 the elements can be stored in a horizontal or vertical position.

Figure 19:
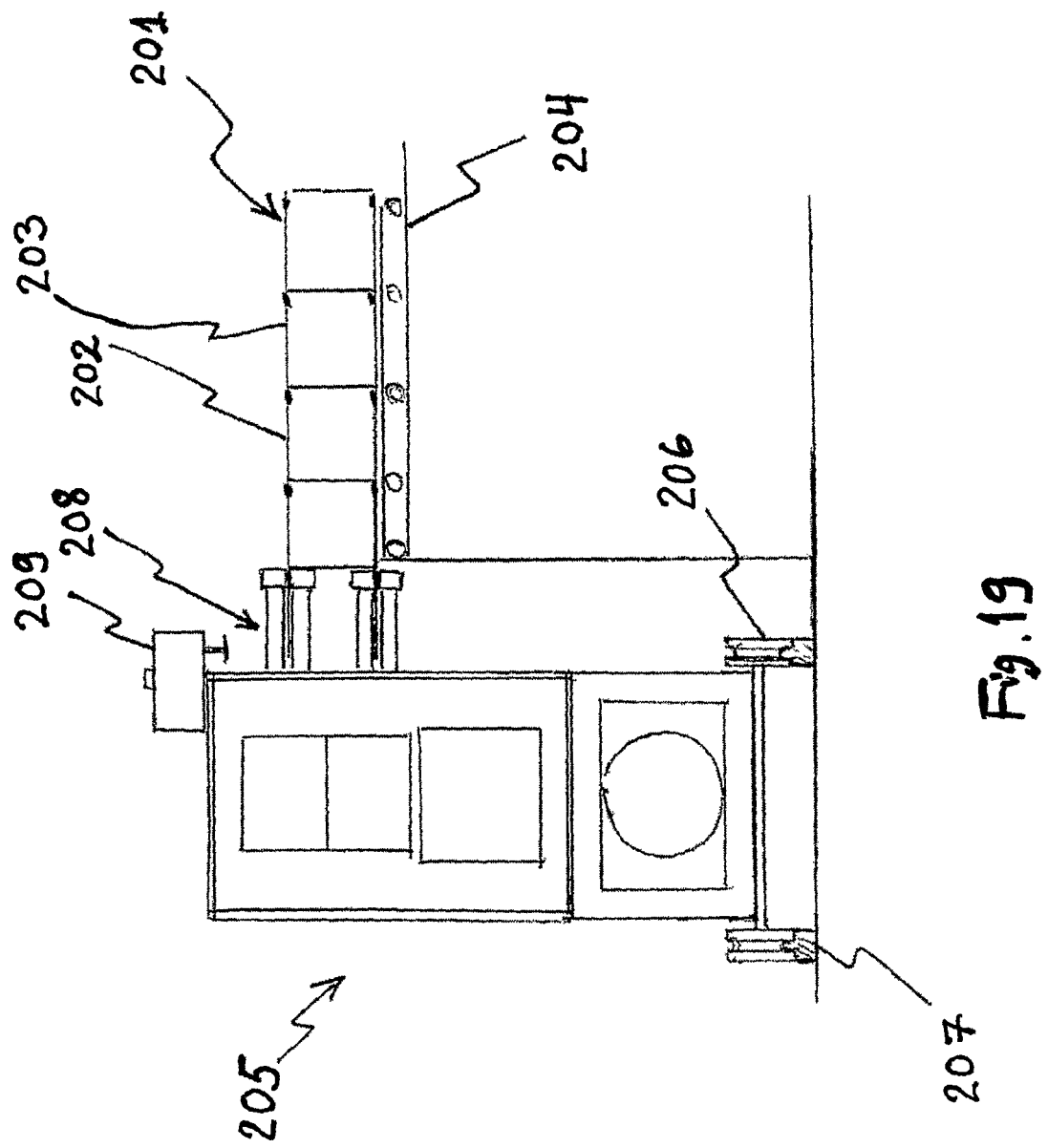
FIG. 19 shows a system according to an embodiment of the invention as seen from one end.
Figure 20:
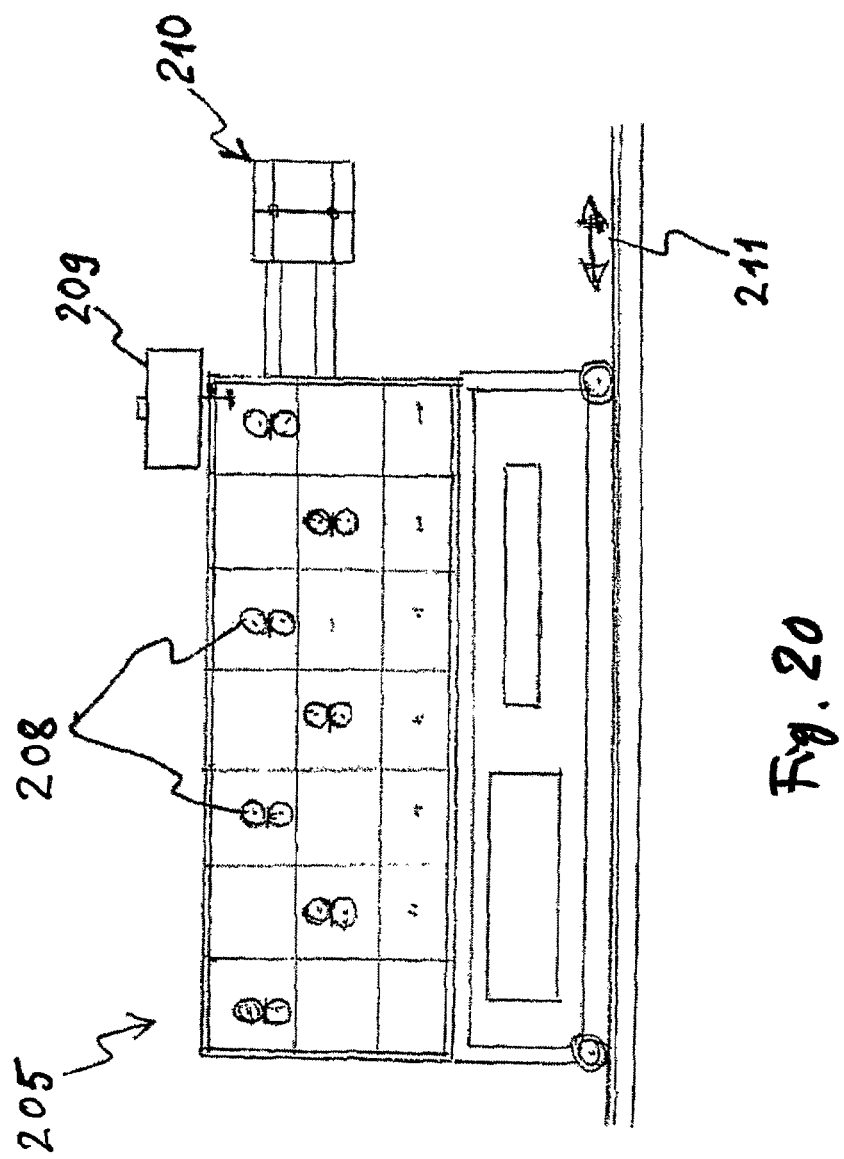
FIG. 20 shows the system of FIG. 19 as seen from one side.
Figure 21:
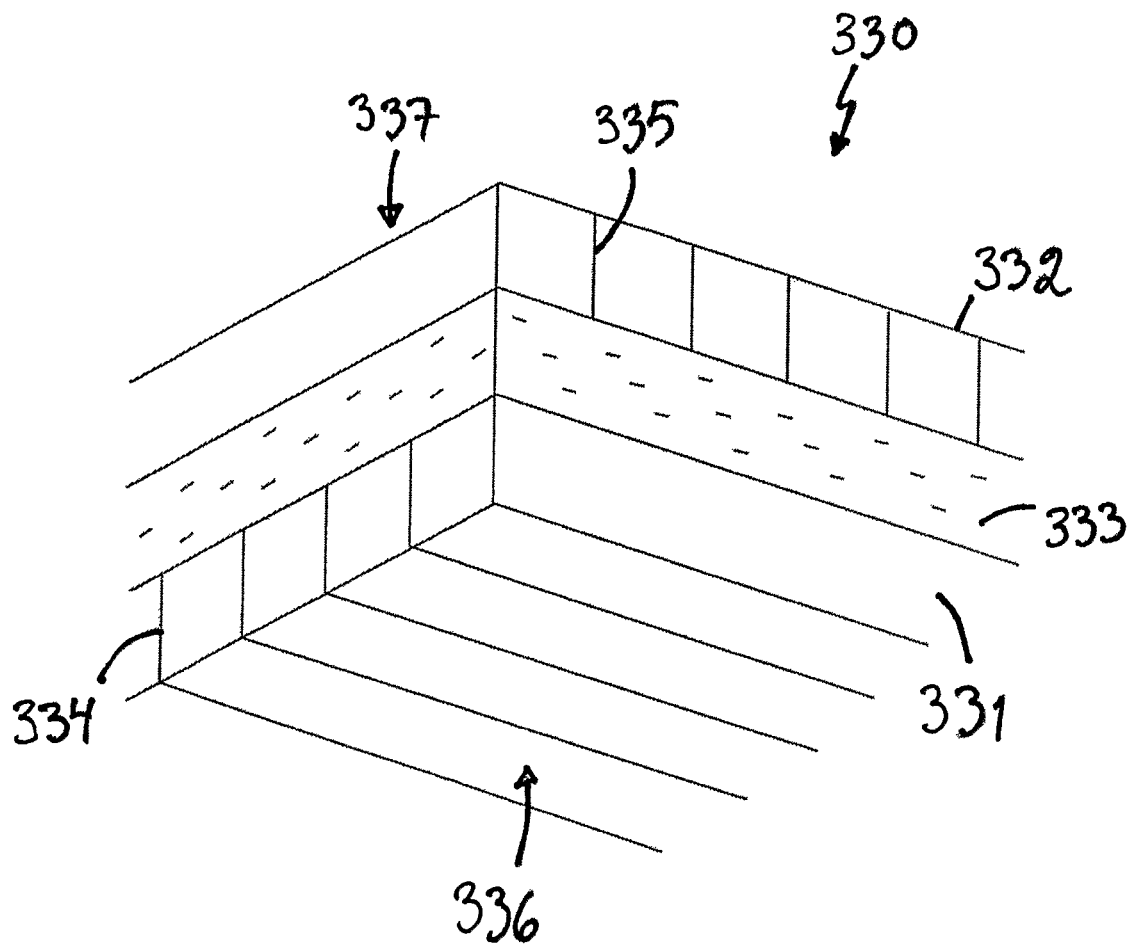
FIG. 21 shows an embodiment of a structure according to the invention.

The system shown in FIGS. 19 and 20 may illustrate an example of the machine seaming i.e. press seaming device 112 and the assembly table 113.

FIGS. 19 and 20 show a system for manufacturing a cellular board element of lamellae 202, 203. FIG. 19 shows a system according to an embodiment of the invention seen from a first direction i.e. from one end. The system has an assembly table 204 of a cellular board element 201 and a press seaming device 205 arranged in connection with it. The press seaming device 205 is arranged to be movable on wheels 206 supported by rails 207 on one side of the assembly table 204. The press seaming device 205 has of course the necessary power sources, such as electric and/or hydraulic motors, control and regulation automatics, clutches and gearboxes, and other required machinery as such known to a person skilled in the art.

The press seaming device 205 has axle systems, pressing and seaming rolls 208 known as such to a person skilled in the art. Advantageously the assembly table 204 is operated so that a finished part of a cellular board element can be moved forward on the table, so that the next lamella can be brought for seaming. Further, the FIG. 19 shows means 209 for arranging isolating material, such as urethane glue, in between at least some lamellae before said lamellae are press seamed.

On the cellular board element assembly table 204 the press seaming device 205 press seams the pre-fastened lamellae firmly to each other at their fixing folds, and thus components of a cellular board element are formed. The operations are for instance as follows: an already seamed part of a cellular board element is pushed on the assembly table over the width of a lamella, after which new pre-assembled lamellae are brought so that they can be seamed to the component of the cellular board element. The number of lamellae seamed side by side to each other determines the width of the cellular board.

FIG. 20 shows the system of FIG. 19 seen from one side or in a direction transversal to that of FIG. 19. An arrow 211 in the figure shows the motion direction of the press seaming device 205. Further, the figure shows means 210 for feeding lamellae to the press seaming device. When the press seaming device 205 has press seamed the lamellae 202, 203 to each other and to previously seamed lamellae, in other words, when it has moved from the first end to the second end of the assembly table 204, then it will move the next lamellae to a correct processing position as it returns to its original position. Then the press seaming device can immediately begin a new seaming cycle, i.e. move again from the first end of the assembly table to its second end and at the same time seam all necessary seams. Typically the seams in question are for instance the top and bottom seams of a lamella.

FIGS. 21 to 24 show a building's load-bearing planar structure 330 comprising a first planar cellular board 331, a second planar cellular board 332 and a planar insulation layer 333, which is fixed between the first and second cellular boards. The cores 334 of the cellular board 331 are arranged in parallel with the plane of the cellular board 331 and mainly directed in a first direction. The cores 335 of the cellular board 332 are arranged in parallel with the plane of the cellular board 332 and mainly directed in a second direction. The first and second cellular boards and the insulation layer between them are mainly parallel. The cores 334 and 335 are mainly perpendicular to each other. The surface of the first cellular board 331 directed away from the insulation layer 333 is the bottom surface 336 of the structure 330. The surface of the second cellular board 332 directed away from the insulation layer 333 is the top surface 337 of the structure 330. The first and second cellular board 331 and 332 are for instance cellular steel boards according to the FIGS. 16 and 17 or 1 to 15.

Figure 22:
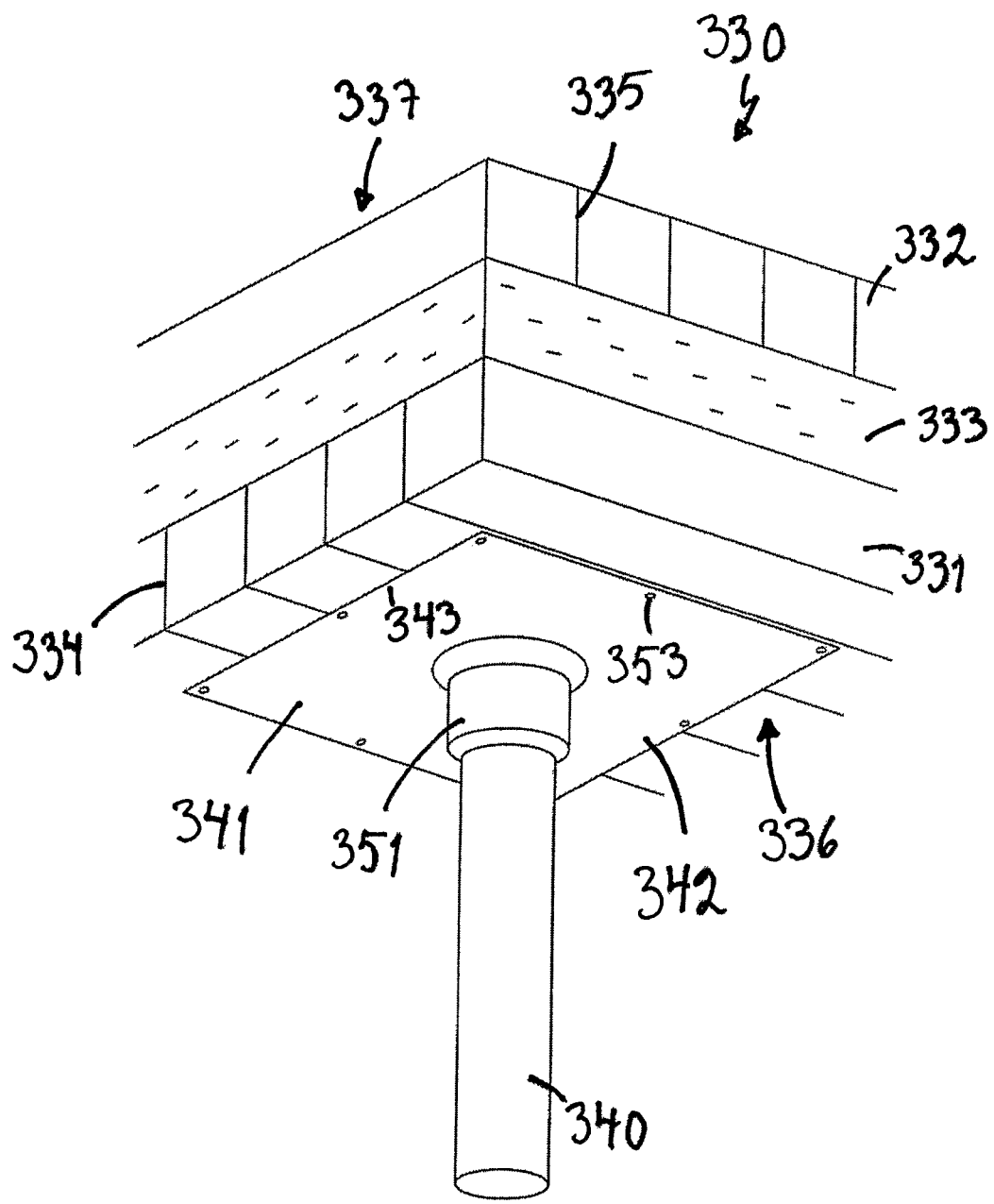
FIG. 22 shows a second embodiment of a structure according to the invention.
Figure 23:
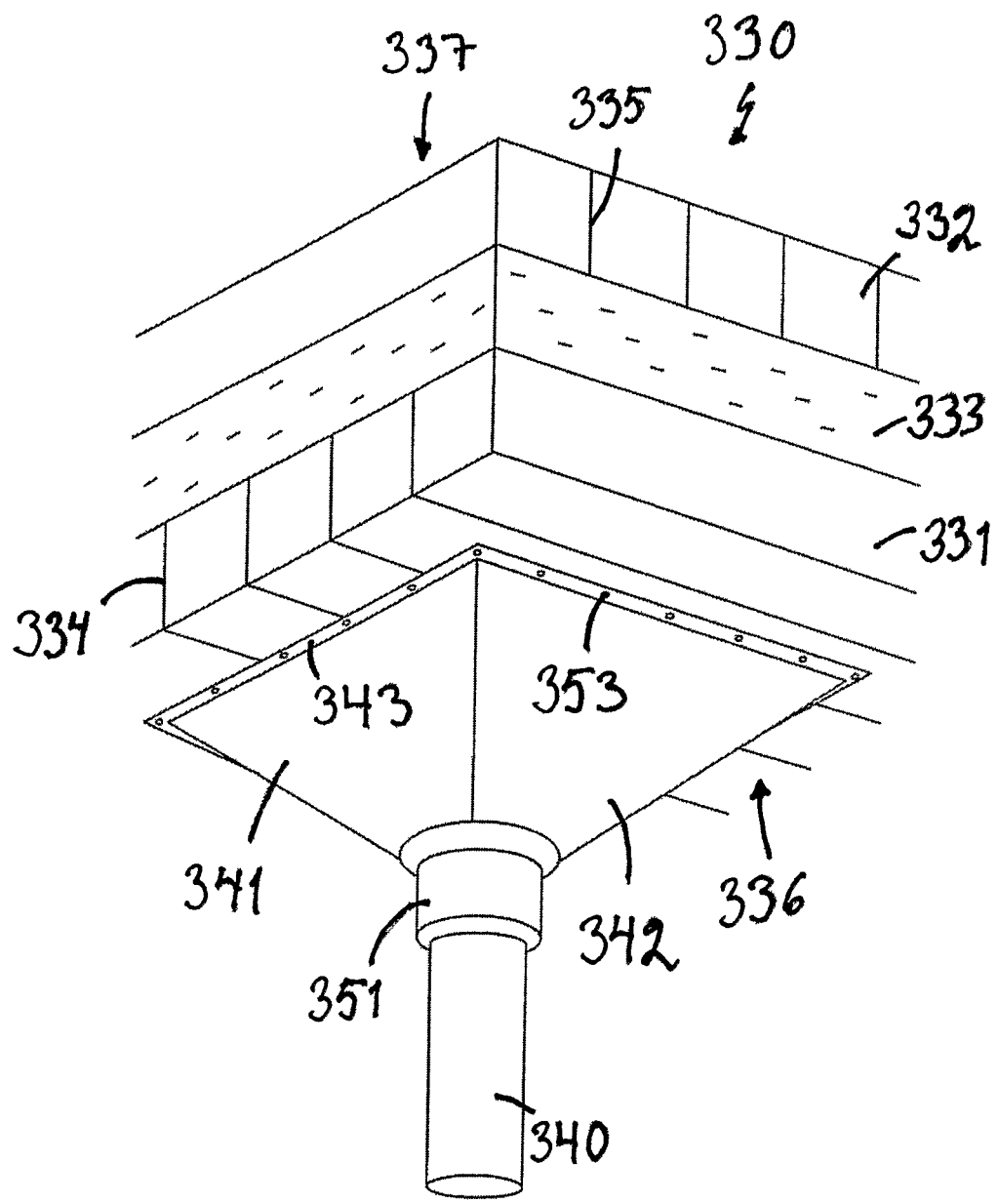
FIG. 23 shows a third embodiment of a structure according to the invention.
Figure 24:
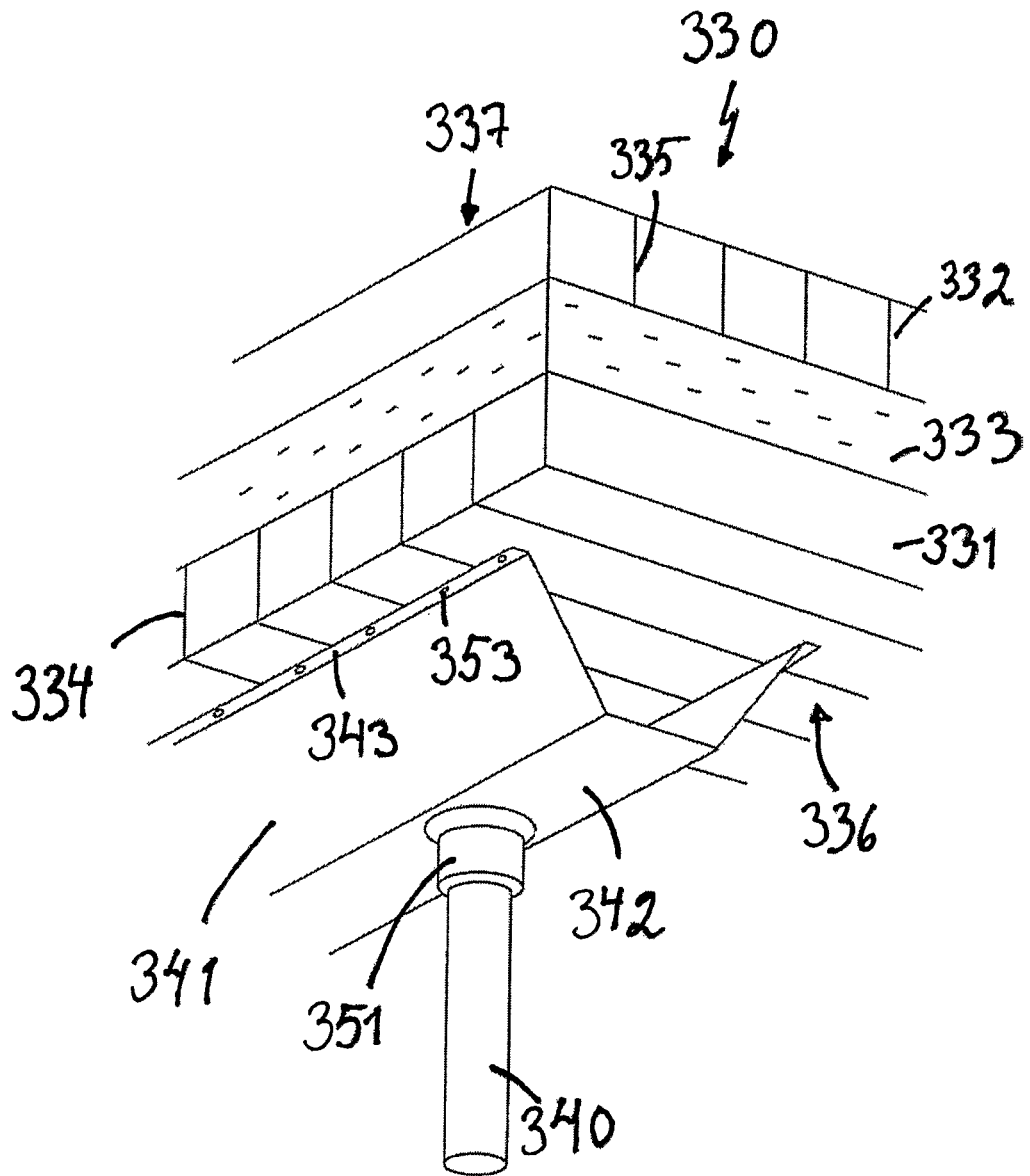
FIG. 24 shows a fourth embodiment of a structure according to the invention.

FIGS. 22 to 24 show structures 330, which are intended as load-bearing structures of buildings. The bottom surface 336 of the structure is supported on an elongated pile 340. The pile can be for instance of steel or concrete. The pile 340 is substantially vertical, i.e. substantially perpendicular to the mainly horizontal direction of the structure 330. The pile 340 is fastened to the bottom surface 336 of the cellular board 331 via a pile cap 341. For the pile the pile cap has a fastening part 351 fitting over the pile. The pile cap 341 distributes the load applied by the pile 340 against the bottom surface 336 of the structure via its extension part 342 over an area, which is larger than the end of the pile 340, i.e. over the contact area of the pile cap. The contact area is determined by the edges 343 of the pile cap's extension part 342, which are fastened to the bottom surface 336. The contact area of the pile cap 341 is substantially larger than the area of the end of the pile 340 fastened to the pile cap, as projected on the bottom surface. The pile cap is fastened to the bottom surface 336 of the structure 330 with fastening members 353, for instance with bolts or by welding.

In the embodiment of FIG. 22 the extension part 342 of the pile cap is a planar plate. The planar plate can be for instance a steel plate with a thickness of at least 10 mm. In practice there is a risk that even a relatively thick plate 342 might bend so that the edges 342 come off the bottom surface 336. This reduces the contact area, and the load of the pile 340 will be directed on an even smaller area against the structure 330.

In the embodiment of FIGS. 23 and 24 the extension part 342 of the pile cap is mainly made of plate-like material and arranged in connection with the bottom surface 336 of the structure only at the edges 343 of the extension part 342. The direction of the plane of this plate-like material differs substantially from the direction of the plane of the bottom surface 336. However, the edges 343 can be bent to be mainly in the direction of the plane of the bottom surface 336. An arrangement like this always distributes the forces from the pile 340 directed against the structure 330 over a large area of the bottom surface 336. The material of this plate-like extension part can be steel plate with a thickness of for instance 3 to 10 mm.

FIG. 23 shows an extension part 342 having mainly the form of a truncated pyramid.

FIG. 24 shows an extension part 342 having a trough-like form. In a vertical cross-section the trough of the extension part 342 has mainly the form of the letter V or U opening towards the bottom surface 336.

The figures only show some advantageous embodiments according to the invention. The figures do not particularly present any details, which are secondary to the main idea of the invention or known as such, or being as such obvious to a person skilled in the art. To a person skilled in the art it is obvious that the invention is not limited only to the examples presented above, but the invention may vary within the scope of the claims presented below. The dependent claims present some possible embodiments of the invention, which as such should not be construed as limiting the scope of the invention.

The invention claimed is:

1. Cellular board comprising:
   first and second substantially parallel surface plates and a core structure between the plates, wherein
   the cellular board comprises a number of profiles of plate-like material fastened to each other, the plate-like material of the profiles having first and second profile folds to thereby establish (i) a substantially planar first surface projection, (ii) a substantially planar second surface projection, and (iii) a core part which separates the first and second surface projections and is connected to the first and second surface projections by the first and second profile folds, respectively, wherein
   the profiles are fastened to each other so that in adjacent profiles the first surface projections thereof are placed side by side and form the first surface plate of the cellular board, the second surface projections thereof are placed side by side and form the second surface plate of the cellular board, and the profile core parts thereof are fastened to the first and second surface plates and form the core structure of the cellular board, and wherein
   the cellular board further comprises mutually fitting fixing folds formed at ends of the first and second surface projections and at the first and second profile folds at a junction between the first and second surface projections and the core part, respectively, such that the profiles to be located side by side are fixed by placing the fixing folds at an end of the first and second projections against a respective fixing fold at the junction between a respective one of the first and second surface projections and the core part, and wherein
   the fixing folds of the profiles forming two adjacent surface projections and one core part of the cellular board are attached and fastened to each other with a machine seam.

2. The cellular board of claim 1, wherein adjacent profiles are fastened to each other by gluing, riveting, screwing or welding.

3. The cellular board of claim 1, wherein an individual profile is made of a single planar thin metal plate of a suitable size, so that edges, depressions, protrusions or other shapes are formed in the thin metal plate.

4. The cellular board of claim 1, wherein the adjacent profiles are fastened to each other at fixing folds located against each other with at least one fixing member selected from the group consisting of glue, rivets, screws, and welded seams.

5. The cellular board of claim 1, wherein the first and second surface projections are arranged to be substantially parallel.

6. The cellular board of claim 1, wherein the first and second surface projections have a substantially identical form or that they are substantially mirror images of each other.

7. The cellular board of claim 1, wherein the core parts are shaped with folds in a zigzag form or in a waveform.

8. The cellular board of claim 1, wherein elongated reinforcing shapes selected from depressions, grooves, projections or protrusions are arranged by cold forming in the first or second surface projections, in the core part, or in both the first or second surface projections and the core part.

9. The cellular board of claim 8, wherein the elongated reinforcing shapes are made by roll forming.

10. The cellular board of claim 1, wherein the cellular board is formed by first and second profile types, wherein the first profile types are arranged to be surface projections and the second profile types are arranged to be core parts.

11. The cellular board of claim 1, wherein the fixing folds are formed at ends of three different profiles and are fixed to each other at one connection point.

12. The cellular board of claim 1, wherein the profiles are Z-shaped.

13. The cellular board of claim 1, wherein the profiles are U-shaped.

* * * * *